United States Patent
Klum et al.

(10) Patent No.: US 9,450,923 B2
(45) Date of Patent: Sep. 20, 2016

(54) SYSTEMS AND METHODS OF DATA SEGMENTATION AND MULTI-POINT STORAGE

(71) Applicant: CRAM Worldwide, Inc., Shoreview, MN (US)

(72) Inventors: R. Daren Klum, Shoreview, MN (US); Mark Hansen, Eden Prairie, MN (US)

(73) Assignee: SECURED2 CORPORATION, Minneapolis, MN (US)

( * ) Notice: Subject to any disclaimer, the term of this patent is extended or adjusted under 35 U.S.C. 154(b) by 0 days.

(21) Appl. No.: 14/077,461

(22) Filed: Nov. 12, 2013

(65) Prior Publication Data

US 2014/0136832 A1 May 15, 2014

Related U.S. Application Data

(60) Provisional application No. 61/725,208, filed on Nov. 12, 2012.

(51) Int. Cl.
G06F 21/60 (2013.01)
H04L 29/06 (2006.01)

(52) U.S. Cl.
CPC ......... H04L 63/0428 (2013.01); G06F 21/606 (2013.01)

(58) Field of Classification Search
CPC ............................. G06F 21/62; G06F 21/60
USPC ..................................................... 380/28–30
See application file for complete search history.

(56) References Cited

U.S. PATENT DOCUMENTS

| | | | |
|---|---|---|---|
| 8,488,785 B2 | 7/2013 | Patawaran et al. | |
| 8,775,825 B2 | 7/2014 | Klum et al. | |
| 8,964,976 B2 | 2/2015 | Patawaran et al. | |
| 2003/0188153 A1 | 10/2003 | Demoff et al. | |
| 2003/0208693 A1* | 11/2003 | Yoshida | 713/201 |
| 2004/0003272 A1 | 1/2004 | Bantz | |
| 2004/0049700 A1 | 3/2004 | Yoshida | |
| 2007/0136200 A1 | 6/2007 | Frank et al. | |
| 2009/0254572 A1* | 10/2009 | Redlich | G06Q 10/06 |
| 2009/0327751 A1* | 12/2009 | Koifman et al. | 713/189 |
| 2010/0246819 A1* | 9/2010 | Candelore | 380/210 |
| 2010/0250497 A1* | 9/2010 | Redlich | F41H 13/00 707/661 |
| 2012/0159175 A1 | 6/2012 | Yocom-Piatt et al. | |
| 2012/0203990 A1* | 8/2012 | Konig | 711/164 |
| 2013/0097246 A1* | 4/2013 | Zifroni et al. | 709/204 |

OTHER PUBLICATIONS

International Search Report for International Application No. PCT/US2013/069623, dated Feb. 27, 2014 (3 pages).
Written Opinion for International Application No. PCT/US2013/069623, dated Feb. 27, 2014 (5 pages).

* cited by examiner

*Primary Examiner* — Josnel Jeudy
(74) *Attorney, Agent, or Firm* — Hamre, Schumann, Mueller & Larson, P.C.

(57) ABSTRACT

Systems and methods of transmitting data from one location to another location that can be used in a number of applications including, but not limited to, secure transmission of data from one location to another and secure data backup. In one embodiment, a data file is split into pieces and the pieces are placed randomly in a diverse mesh of online cloud storage providers. So all the data is not sitting in a single point of failure and with the entire file available for theft. Each piece of data is given a randomized numerical code that determines where the packet of data is stored. Also, the pieces of data can be encrypted.

21 Claims, 7 Drawing Sheets

SYSTEMS AND METHODS OF DATA SEGMENTATION AND MULTI-POINT STORAGE

FIELD

This disclosure relates to systems and methods of transmitting data from one location to another location. The systems and methods described herein can be used in a number of applications including, but not limited to, secure transmission of data from one location to another and data backup.

BACKGROUND

Many of today's markets like financial, legal, military, education, entertainment and medical are all seeing their data grow exponentially. The market has coined the term "big data" to explain the rise of large databases and the growing amount of data being driven by every industry. The growing trend to maintain large amounts of structured and unstructured data is largely led by growing Governmental regulations and compliances. These factors are leading to the explosive growth of the cloud and data storage technologies.

One of the most common words used in the world of big data is the cloud. The cloud is coined term that refers to a large data "warehouse" that holds "offsite" a company's critical information using the Internet as a transport mechanism for the data. The cloud can be used in many different ways and by definition is the use of computing resources (hardware/software) that are delivered as a service over a network like the Internet. The cloud is about scale and very few companies have the ability to scale so the idea of "shared" infrastructure is a logical progression for most companies. It offloads costly IT in a model that becomes cost effective for any business. The challenge with any shared infrastructure and any "offsite" data system like the cloud is security. Can you really trust your data with someone else? How can you be sure they are not viewing the data? Who is liable for securing the data and how can you be sure best practices are being upheld? Security is especially a concern in an age where data theft is the invisible crime and exploding as we move to the cloud. The reality is that most data owners don't know they are hacked as hacking has been called the invisible crime.

Whether information is stored in a public cloud (off premise), private cloud (on premise), or a hybrid cloud (a combination of both), digital security is the biggest challenge for the cloud. And up until this point, it is very clear the cloud is hackable.

Today's data back-up systems use many different configurations, parameters and security technologies. A data back-up system typically refers to the archiving or copying of files from one location to a back-up location, allowing the user or company to restore the original data after a data-loss event. Most data back-up systems are a one-to-one relationship between a primary computer and a data back-up computer, server or cloud fabric. Due to the outbreak of data breaches, the traditional way of backing up data is not working and a new approach is needed.

However, the problem of data security and hacking is not limited to stored data but also includes general data transmissions on both public networks and private networks.

SUMMARY

Systems and methods of transmitting data from one location to another location are described that can be used in a number of applications including, but not limited to, secure transmission of data from one location to another and secure data backup.

In one embodiment described herein, one approach to securing digital content and most importantly the cloud is to split the data file into pieces and place the pieces randomly in a diverse mesh of online cloud storage providers. So all the data is not sitting in a single point of failure and with the entire file available for theft. The idea of splitting data into pieces or segments is referred to herein as "data division or data slicing or segmenting data" and provides a way to securely place files at rest in any data archival environment. Each piece of data is given a randomized numerical code that determines where the packet of data is stored. Also, each data packet is encrypted, for example using 128 bit or 256 bit encryption, to encapsulate the data during transit. So there is a key management component that deals with the securing of each divided piece of data.

One benefit to this approach is the ability to speed up data upload and data retrieval from the cloud. By placing divided pieces of data across multiple cloud providers, it takes far less time to send or retrieve data because the diverse clouds act like RAID drives.

The techniques described herein provide the same level of data back-up and retrieval as conventional techniques, however using it in a much different way. During a data backup, single files are divided into pieces which are placed randomly in multiple cloud environments. For instance, a file would be broken into pieces, and each piece would be placed in a different location in a multiple could environment. For example, one piece could go to Amazon storage, another piece could go to Rackspace storage, another piece could go to Microsoft storage, and the like. When the user wants to retrieve the data, the system knows where the divided data rests and reassembles the data into the original file(s).

In another embodiment, the techniques described herein can also provide a user interface that can be loaded on a PC, server, laptop or stand-alone appliance (such as a mobile phone or tablet). The user interface allows the user to select the data (files, folders and drives) that they wish to back-up or retrieve. The user can also use "file tiles" that make the selection of certain files easier than finding them individually. These tiles can be customized and assigned to whatever file type the customer chooses to use. The user can have as many tiles as they choose. The user interface can also allow a user to assemble a list of cloud storage locations that can be used to store the data pieces.

In one embodiment, a method of transmitting data over a network includes segmenting the data into a plurality of data segments, encrypting the data, assigning the data segments to a plurality of data segment receiving locations, and transmitting the data segments over the network to the plurality of data segment receiving locations. One or more of the data segments are transmitted to the data segment receiving locations.

In one embodiment, the plurality of data segment receiving locations can be randomly selected from a user generated list of possible data segment receiving locations. The data segment receiving locations can be public locations available on a network, such as the Internet, private locations such as a private network, or a combination of public and private locations.

The data can be encrypted before segmenting the data into the plurality of data segments, the data segments can be encrypted, or the data can be encrypted twice such as before segmenting the data into the plurality of data segments as well as encrypting each of the data segments.

In one embodiment, the plurality of data segment receiving locations are cloud data storage locations that store the data segments. In another embodiment, the data segment receiving locations only temporarily receive the data segments, with the data segments being forwarded from the data segment receiving location to a receiving device at a second location separate from the first location where the data originated.

When the data is stored at the date segment receiving locations, the data segments can be retrieved from the data segment receiving locations and reassembled to reform the data.

In another embodiment, a data backup method includes taking data that is stored in a data storage device at a first location and segmenting the data into a plurality of data segments, encrypting the data, assigning the data segments to a plurality of data segment receiving locations that are available to the first location via a network, and transmitting the data segments to the plurality of data segment receiving locations.

In still another embodiment, a data segmenting device includes a local data interface configured to communicate with a local data storage device for receiving data from the data storage device. The device can also include a data encryption module that encrypts data that is received from the data storage device, a data segmenting module that segments data that is received from the data storage device into a plurality of data segments, a data segment assigning module that is configured to assign the data segments to a plurality of data segment receiving locations, and a network interface configured to communicate over a network with the plurality data segment receiving locations to send the data segments to the assigned data segment receiving locations and to receive data segments from the data segment receiving locations.

In yet another embodiment, a data backup system includes a data storage device at a first location, and a data segmenting device in communication with the data storage device for receiving data from the data storage device. The data segmenting device includes a data encryption module that encrypts data that is received from the data storage device, a data segmenting module that segments data that is received from the data storage device into a plurality of data segments, a data segment assigning module that is configured to assign the data segments to a plurality of data segment receiving locations, and a network interface configured to communicate over a network with the plurality data segment receiving locations to send the data segments to the assigned data segment receiving locations and to receive data segments from the data segment receiving locations.

The modules of the data segmenting device described herein can be implemented as software, firmware, hardware or combinations thereof.

DRAWINGS

FIG. 1 schematically depicts a data transmitting system described herein.

FIG. 2 is a flow chart of a data transmitting method described herein.

FIG. 3 schematically depicts a data segmenting device that is useable with the systems and methods described herein.

Figure 6:
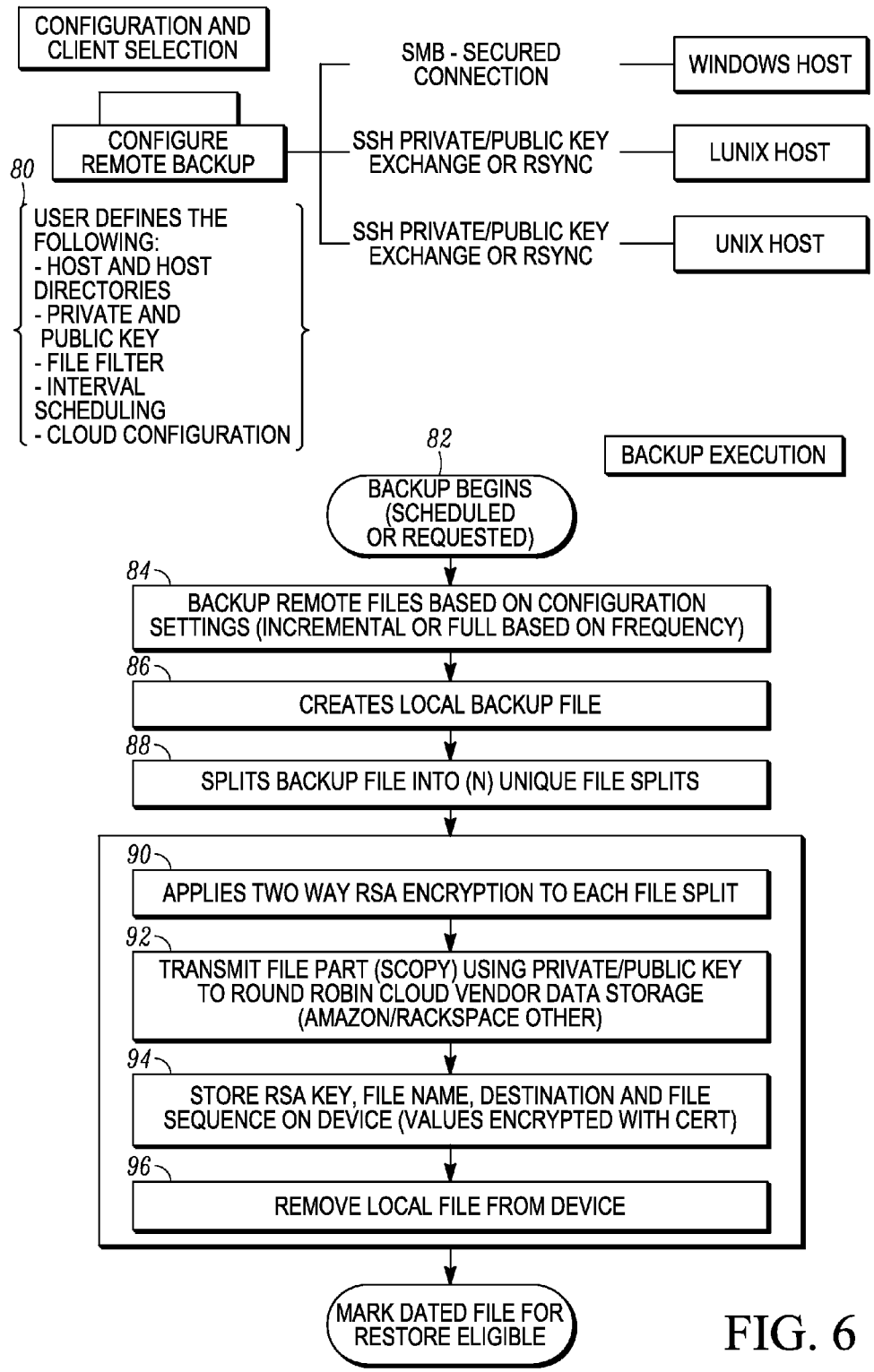

FIG. 6 schematically depicts one embodiment of a data backup implementation.

Figure 7:
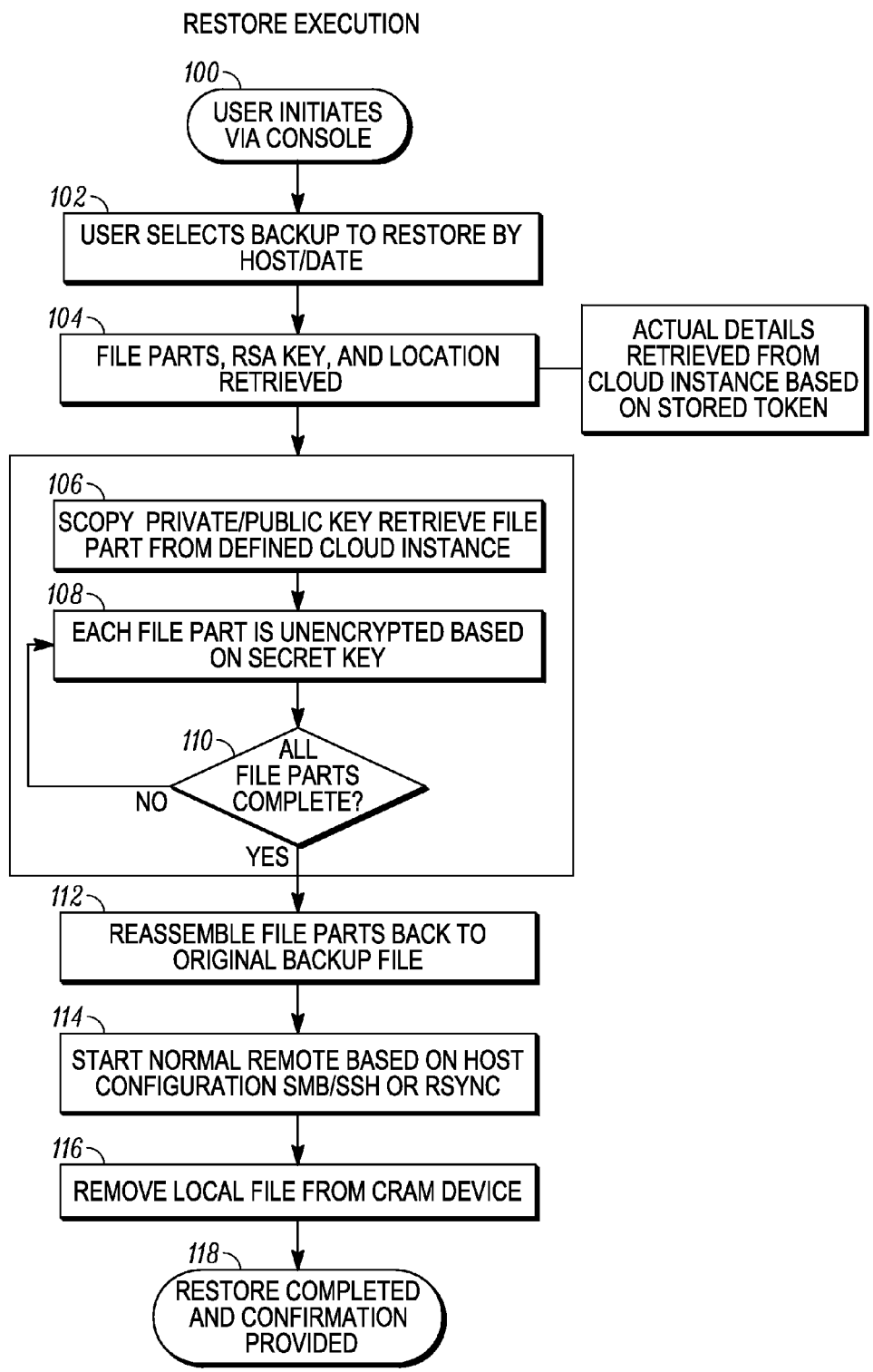

FIG. 7 schematically depicts one embodiment of a data retrieval implementation.

DETAILED DESCRIPTION

The following description describes systems and methods of transmitting data from one location to another location. In general, the described systems and methods involve dividing data into a plurality of segments or pieces, which are then assigned to a plurality of data segment receiving locations, and then each segment is sent to its assigned data segment receiving location. Therefore, all of the data is not located in a single location to deter theft of the data.

The described systems and methods can be used in a number of applications including, but not limited to, secure transmission of data from one location to another and secure data backup.

Figure 1:
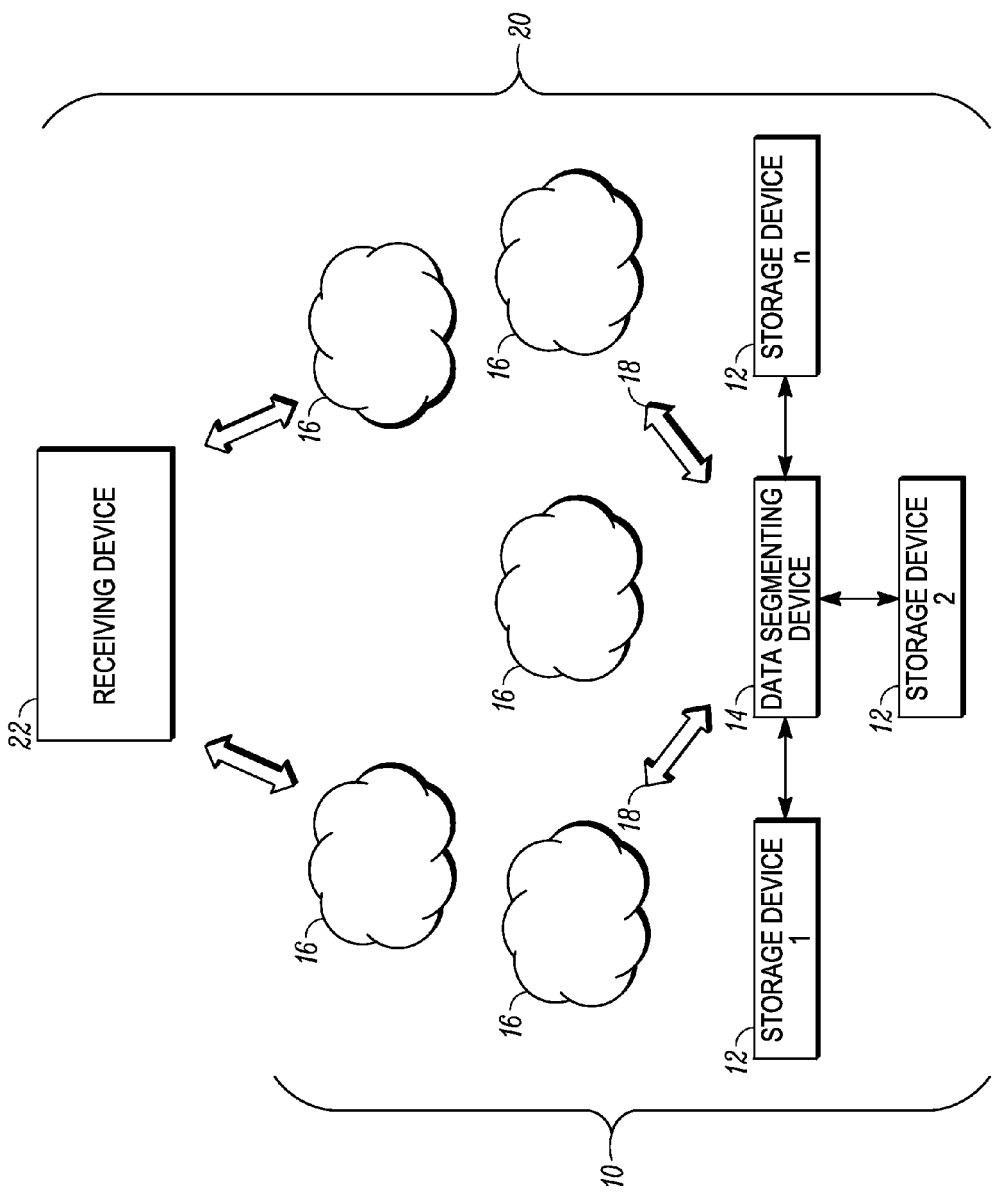

With reference to FIG. 1, one example of a system 10 is illustrated. In this example, data from one or more data storage devices 12 is provided to a data segmenting device 14 at one location. The segmenting device 14 divides the data into a plurality of segments and then sends out the data segments over a network 18 to a plurality of data segment receiving locations 16 in the network. In this example, the system 10 is a data backup system for backing up data from the storage device(s) 12 and the data segment receiving locations 16 are data storage locations which store the data segments as part of the data backup. The data backup can be of all of the data on the storage device(s), or selected portions of the data on the storage device(s).

In a variation of the system illustrated in FIG. 1, a system 20 for secure transmission of data includes one or more of the data storage devices 12, the data segmenting device 14, the receiving locations 16, and the network 18 as well as a receiving device 22. In this example, the receiving locations 16 receive the data segments but then transmit the data segments to the receiving device 22. The receiving device 22 can then reassemble the data from the data segments. One advantage of the system 20 is that during transmission, the various data segments are routed through multiple locations. Therefore, there is not a single channel through which all of the data passes on its way to the receiving device 22, making interception and theft or hacking of the data very difficult.

In each of the systems 10, 20, the data segment receiving locations 16 can be public locations, private locations, or a combination of public locations and private locations. Public locations include cloud data storage locations available on the Internet examples of which include, but are not limited to, Rackspace, Amazon, Microsoft, Google, EMC and the like. Private locations include servers or other data storage devices connected via a local area network to the data segmenting device 14, such as company networks. In one embodiment, the private data storage devices can be owned by or at least subject to the control of the owner of the data storage device(s) 12. The receiving locations 16, whether public or private, can be any locations each of which has a CPU, memory, and a hard drive making the locations suitable for receiving, storing and transmitting the data segments in the case of the system 10, or suitable for receiving and transmitting the data segments in the case of the system 20.

The network(s) 18 containing the receiving locations 16 can be a public network like the Internet or other wide area network, a local area network, a private network, or combinations thereof.

In the case of the system 20, the receiving device 22 can be, for example, a PC, server, laptop or stand-alone appliance such as a mobile phone or tablet to which someone may want to send data. The receiving device 22 can directly receive the data segments as implied from FIG. 1 and reassemble the data segments to reform the data. Alternatively, the data segments can be routed from the receiving locations 16 through one or more intervening locations or devices which reassemble the data segments before the data reaches the receiving device 22. The receiving device 22 can also transmit data back to the storage device(s) 12, in which case a data segmenting device 14 can be provided that is connected to the receiving device 22.

The various communications between the storage device(s) 12 and the data segmenting device 14, between the data segmenting device 14 and the receiving locations 16, and, if used, between the receiving device 22 and the receiving locations 16 can be achieved using conventional communication technologies well known to those of ordinary skill in the art. The communications can be wireless, wired, or a combination of wireless and wired.

Figure 2:
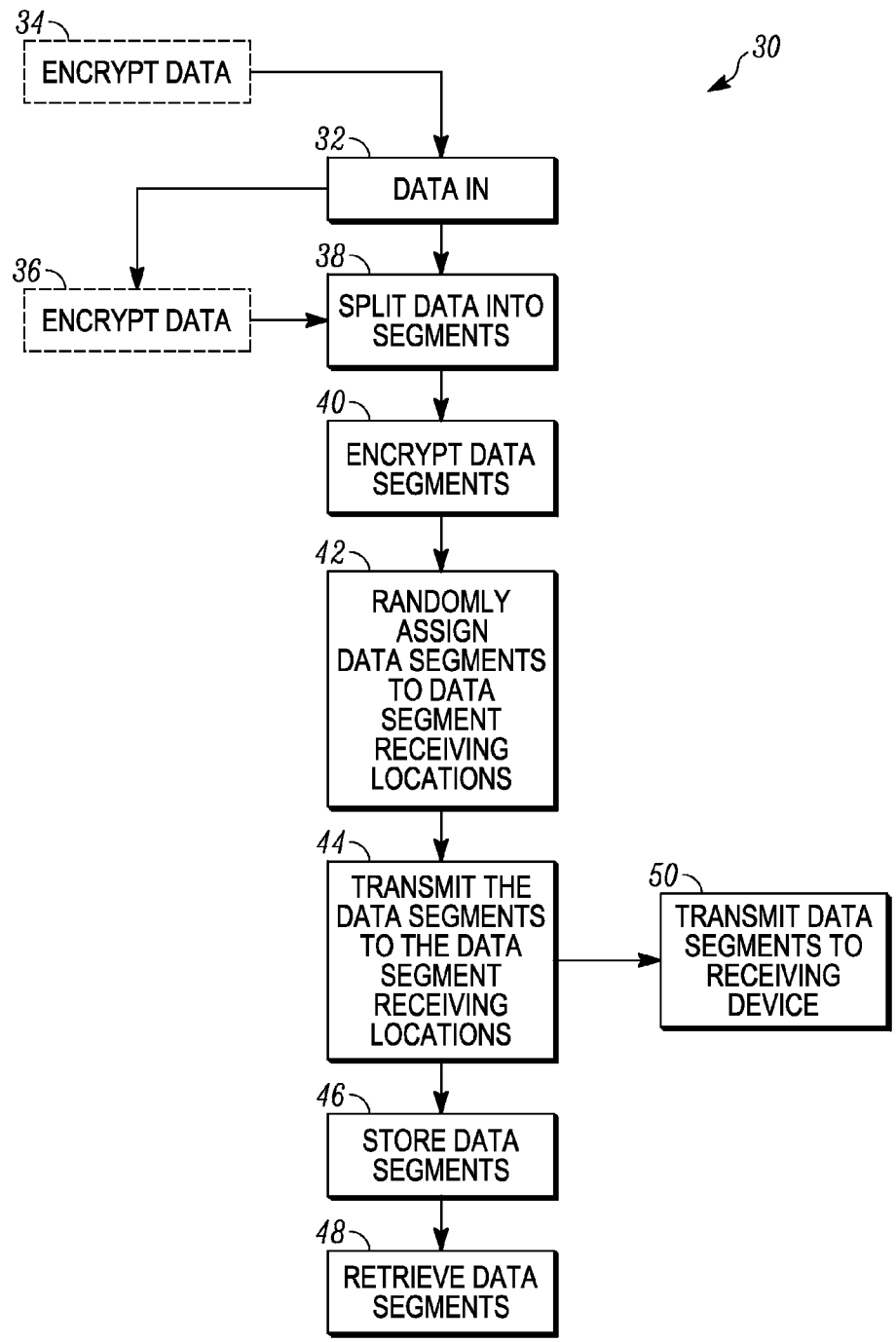

With reference to FIG. 2, a data transmitting method 30 that can be implemented by the system 10 or the system 20 is illustrated. In a step 32, data to be transmitted is input into the data segmenting device 14. The data can be input from the storage device(s) 12 or obtained from a removable data storage device like a CD, flash drive, or the like. Optionally, as illustrated in dashed lines in FIG. 2, the data can be encrypted in a step 34 prior to being input into the data segmenting device 14, encrypted after the data is input in a step 36, or both encryption steps 34, 36 can be performed. If implemented, any suitable encryption technique known in the art, for example 128 bit or 256 bit encryption, can be used.

The data is then split into a plurality of data segments or pieces in a step 38. The data segments are discrete pieces of data that can each be separately transmitted to the receiving locations 16. The pieces of data can be generally equal in size to each other (for example with roughly an equal number of bytes in each piece), or the pieces can vary in size from one another. The number of separate data segments that the data is divided into can vary based on the level of security desired. There needs to be a minimum of two segments with no upper limit on the number of segments. In general, the more data segments, the higher the security.

Splitting the data into segments can be accomplished, but is not limited to, in the following exemplary manner. The splitting into segments can be based on a configuration selected by the user as well as factoring in transmission time for the segments. The system can be configured for a maximum "N" MB of storage for each segment. In one example, the default maximum can be 7 MB. Then based on the total size of the data after compression and encryption, the data is divided into a maximum of 1000 segments and the size of the segments is adjusted between 1 MB and maximum "N" MB. If the maximum number of segments is reached, the process will create greater than 1000 segments with each segment being a maximum of "N" MB.

The data segments are then encrypted in a step 40. Any suitable encryption technique known in the art, for example 128 bit or 256 bit encryption, can be used. Where less security is desired, the encryption step 40 is optional. However, it is preferred that at least one of the encryption steps 34, 36, 40 be performed. In another embodiment, at least one of the encryption steps 34, 36 together with the encryption step 40 are performed.

In step 42, the data segments are then assigned, for example randomly assigned, to the data segment receiving locations 16 that are to receive the data segments. The assignment of the data segments to the receiving locations 16 can be performed randomly so that there is not a defined assignment pattern from which an individual attempting to hack the data can readily discern where the data segments have been transmitted. The random assignment of the data segments can be performed using conventional randomization techniques known in the art.

In one embodiment, the receiving locations are randomly selected from a user generated list of possible data segment receiving locations. In this embodiment, the user is able to designate which receiving locations can be used, with the user selections being stored in a list of available locations. The system then randomly assigns the data segments to some or all of the storage locations on the list.

In step 44, the data segments are then transmitted from the data segmenting device 14 to the various randomly assigned data segment receiving locations 16. In the case of the system 10, the data segments are then stored at step 46 at the various receiving locations 16 for possible later retrieval in a step 48.

As will be discussed in further detail below, the data segments are each tagged in a manner to allow later retrieval and reassembly of the data segments into the original data. In addition, a report is suitably stored, for example in the data segmenting device 14, in the storage device(s), or other location that indicates information suitable for retrieval and reassembly of the data segments. For example, the report can contain a key(s) for decrypting the data segments and the data, a file name assigned to each data segment, a file name assigned to the original data, a destination receiving location 16 of each data segment, and the sequence required to reassemble the data segments. The report, or at least the data in the report, can be encrypted as well.

Returning to FIG. 2, in the case of the system 20, the data segments can be transmitted from the receiving locations 16 to the receiving device 22 in a step 50. The data segments can be automatically forwarded by the receiving locations to the receiving device, or the receiving device can send requests to the receiving locations to have the receiving locations transmit the data segments to the receiving device. In this embodiment, the data segments are each tagged as discussed above which allows the receiving device 22 to reassemble the data segments into the original data. In addition, the receiving device is provided with the necessary key(s) to request the data segments (if a request must be sent to the receiving locations), decrypt and reassemble the data segments into the original data.

Figure 3:
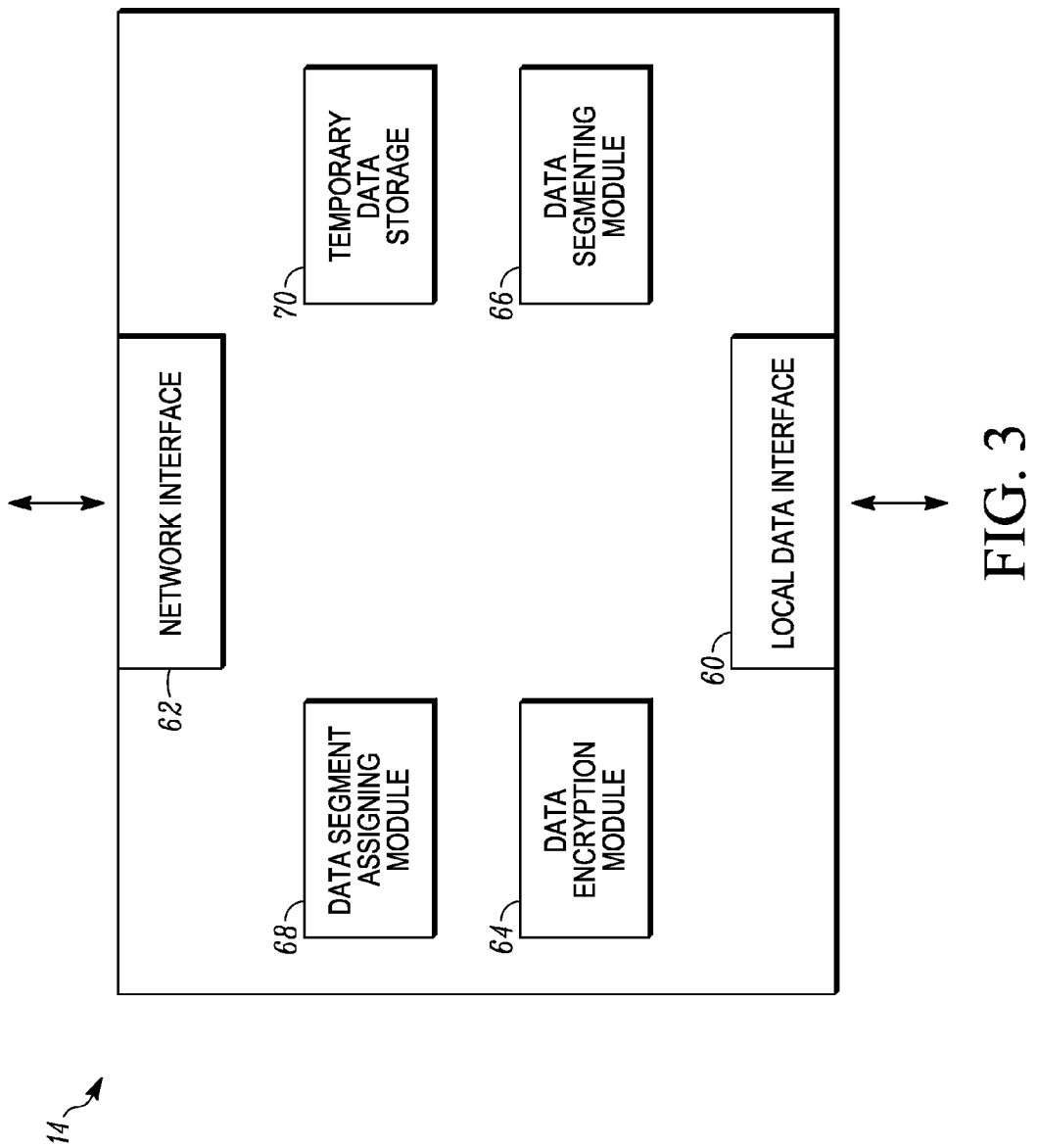

FIG. 3 schematically depicts one embodiment of the data segmenting device 14. In this embodiment, the data segmenting device 14 is a hardware device, such as a server that is suitably programmed, having suitable functionality for performing the functions of the data segmenting device. The data segmenting device 14 can include a local data interface 60 that allows the device 14 to interface, wirelessly or using wires, with the storage device(s) 12 and through which data exchange between the device 14 and the storage device(s) 12 occurs. The device 14 also includes a network interface 62 that allows the device 14 to interface, wirelessly or using wires, with the data segment receiving locations 16 and through which data exchange between the device 14 and the receiving locations 16 occurs.

The device 14 also includes a plurality of function modules implemented in hardware, software, firmware or combinations thereof, for performing the various functions of the device 14. For example, the device 14 includes a data encryption module 64 that performs at least one of the encryption operations on the data and/or the data segments. If two encryption operations are performed, a second encryption module can be provided if desired, or the module 64 can perform both encryptions.

The device 14 also includes a data segmenting module 66 that conducts the segmenting of the data into the segments or pieces, and a data segment assigning module 68 that assigns the data segments to the data segment receiving locations 16.

In one embodiment, the device 14 includes temporary or volatile data storage 70 only and does not include permanent or non-volatile data storage. So the data indicating which receiving locations the data segments were sent to and the like is preferably stored somewhere other than in the device 14. Therefore, if the device 14 is stolen or hacked, the locations of the data segments cannot be determined from the device.

In another embodiment, the device 14 includes permanent or non-volatile data storage. In this embodiment, a local backup copy of the original data is stored in the device 14. In addition, the data indicating which receiving locations the data segments were sent to and the like can also be stored in the device 14.

If desired, access to the device 14 can be controlled using one or more physical authentication access control features, such as retinal or other biometric features, voice access, signature access, or the like. Further, to enhance security, any one or more of the data encryption steps 34, 36, 40 described herein can be supplemented using physical authentication features, for example the same physical authentication features needed to access the device 14.

Figure 4:
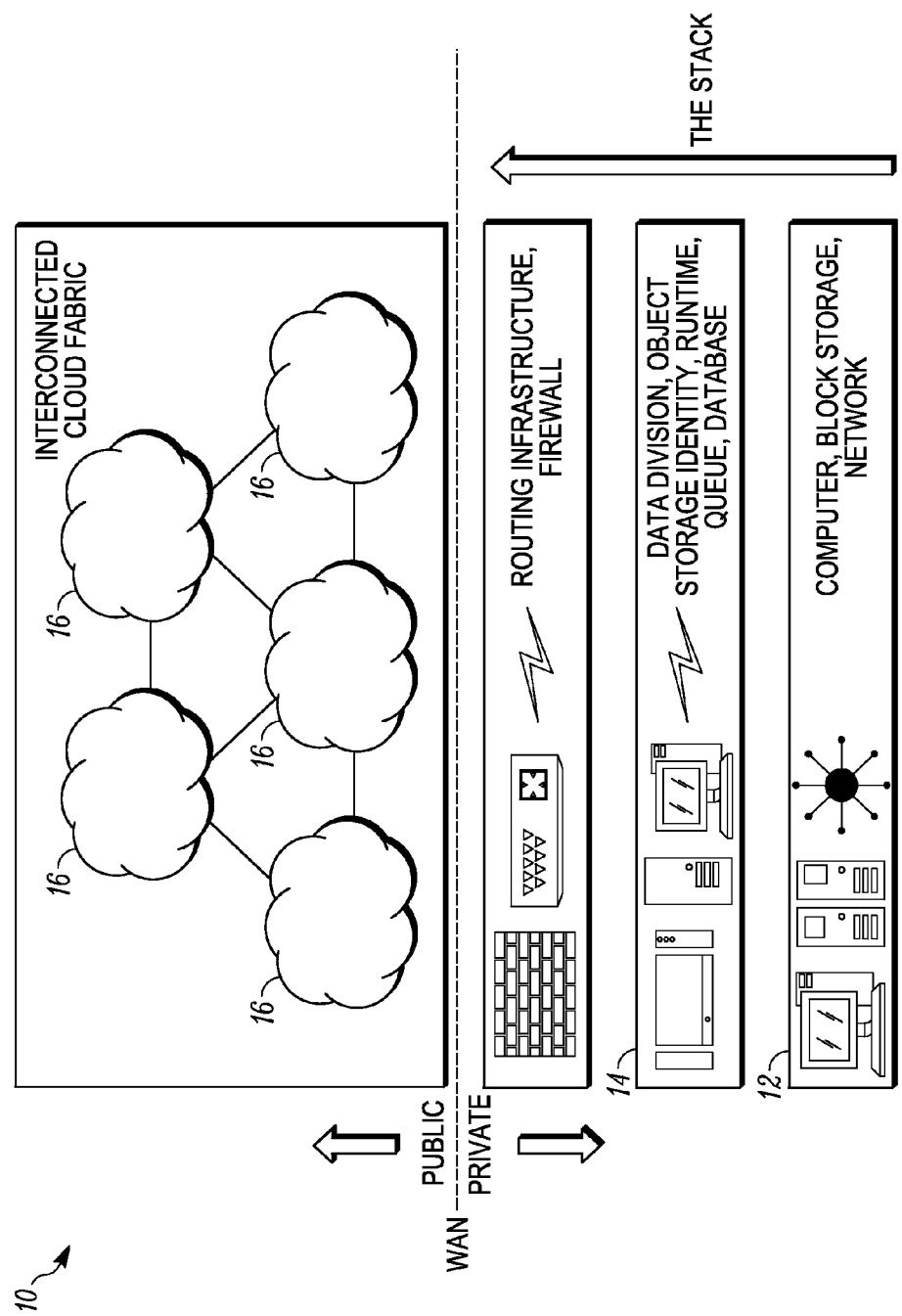
FIG. 4 illustrates one embodiment of a data backup system described herein.
Figure 5:
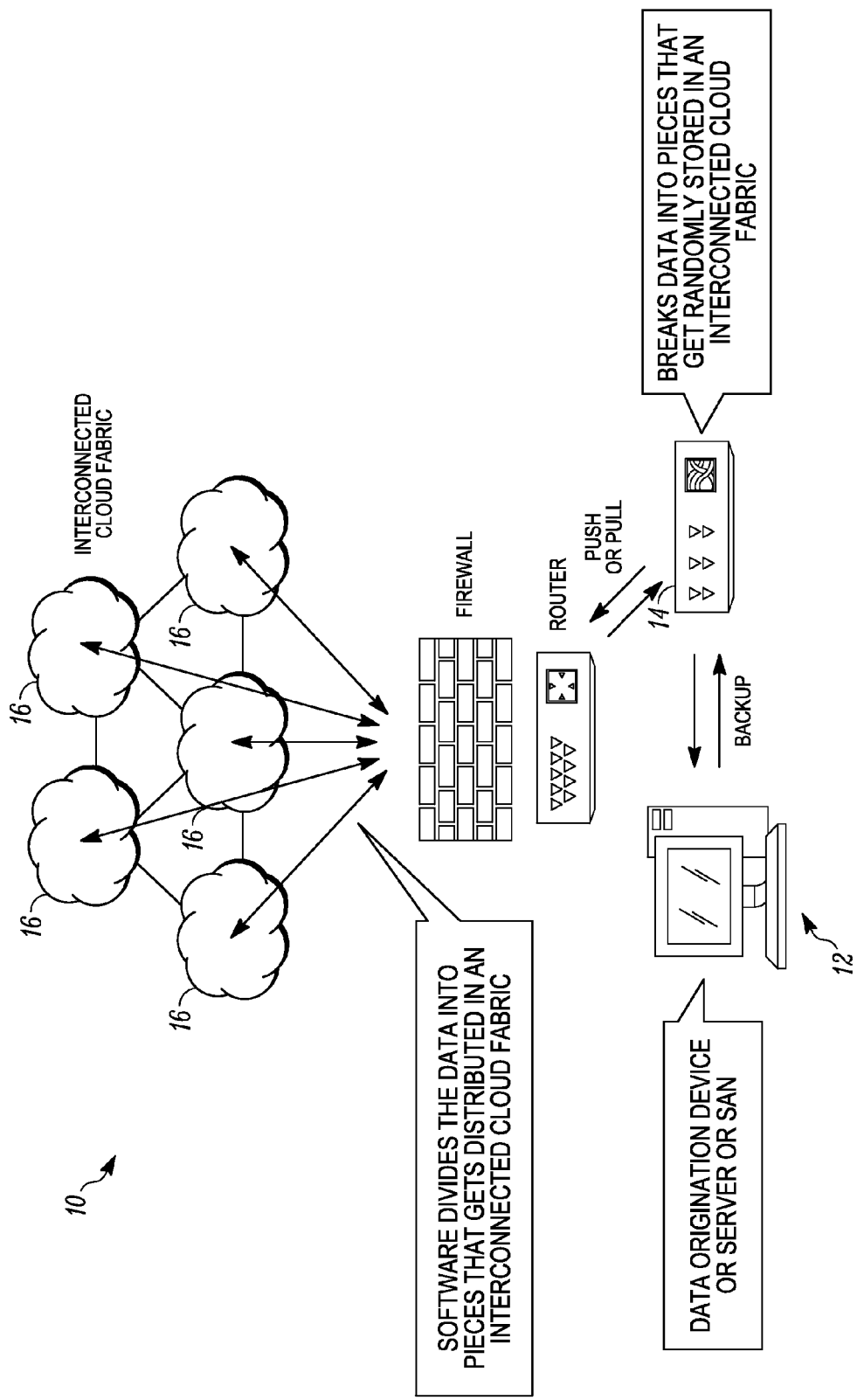
FIG. 5 is another illustration of the data backup system of FIG. 4.

With reference to FIGS. 4 and 5, one specific application of the data backup system 10 is illustrated. In this example, data to be backed-up originates from a suitable storage device(s) 12 or source of data such as a personal computer, server, block storage, storage area network, or any device that stores data. The data is provided to the data segmenting device 14 which splits the data into the segments and assigns the data segments to the receiving locations. The data segments are then transmitted via a router or other suitable technology over the network to the receiving locations 16 which store the data segments.

FIG. 6 illustrates one specific implementation of a data backup. Prior to the data backup execution, the user is able to define one or more configuration settings 80 associated with the data backup. The settings 80 can include, but are not limited to, one or more of a host and host directories of the device hosting the data that needs to be backed up, private and public keys used in the encryption step(s), file filter, interval scheduling which determines how often the data backup occurs, and the cloud configuration i.e. the selection of the data segment receiving locations that are available to be used.

In the data backup process illustrated in FIG. 6, data backup begins at 82 which can be a requested backup or a scheduled backup. The files to be backed-up, whether an incremental back-up or a full back-up, are then located at 84 based on the configuration settings. In one embodiment, a local backup file can then be created 86 in the data segmenting device. The data in the backup file is then split into N data segments 88, and the data segments are then encrypted 90. The encrypted data segments are then transmitted 92 to the data segment receiving locations 16. In addition, the data necessary to retrieve the data segments, such as the encryption/decryption keys, file name of each data segment, the data segment receiving location of each data segment, and the data segment sequence for reassembling the file, can be stored 94 in the data segmenting device 14. If desired, in step 96, the local backup file can be deleted from the device 14. Alternatively, as indicated above, the local backup file can be saved in the device 14. Meta files that describe the file attributes of each file being backed up may also be stored on the device 14. The meta files may facilitate restore requests described below in FIG. 7 and facilitate the ability to do incremental backups.

FIG. 7 illustrates one specific implementation of a data retrieval process for retrieving the backed-up data. In this example, retrieval is initiated via a user restore request 100. The restore process is based on reversal of the backup process. The user selects which data backup that is to be restored 102, for example by specifying the originating host and the date of the backup. The associated data segments, decryption key(s), receiving locations and data sequence are then retrieved 104. The data segments are then retrieved 106 from the receiving locations, and each data segment is decrypted 108. In step 110, it is then determined if all of the data segments are complete. If not, the process returns to step 108 to decrypt each file part. If all segments are complete, the process proceeds to step 112 where the segments are reassembled back into the original backup file, and the host device is restored at step 114 with the backup file. In step 116, the backup file is then deleted from the segmenting device 14. The restore is then completed and optionally a confirmation provided to the user 118.

Aspects

Additional aspects noted below relating to the systems and methods described herein are possible. It is noted that the aspects can be used individually or in any combination with other aspects. In addition, the aspects below can be used individually or in any combination with any of the systems and methods described above and illustrated in FIGS. 1-7.

Aspect 1: A data back-up system using: a communication device with a data source; a storage device that includes a back-up interface/application; a communication interface that allowed wireless or wire-line Internet access, a circuit board with CPU/GPU that attaches to the storage media.

Aspect 2: A method of dividing packets of data from one storage device into abstract, randomized data units that can be broken apart and sent to 2 or more storage devices in remote locations. This method of data transportation relies on some form of "network" connection that allows the data to reach its destination through packet delivery.

Aspect 3: A back-up system where the pre-backup verifies that data can be written to a specific back-up apparatus, in this case multiple computer or storage devices.

Aspect 4: A back-up system where a back-up can be scheduled on a time, day, month or year.

Aspect 5: A back-up system where a user interface is used to select the specific items.

Aspect 6: A back-up system where configurable tiles in the user interface can be tied to multiple file types based on the users preference. These tiles select drive file types automatically and prepare them for back-up.

Aspect 7: A back-up system that provides full disk duplication, individual folder or individual file back-up and retrieval.

Aspect 8: A back-up system comprising of a software application that is run on either the host computer or a back-up appliance that plugs into the host computer or storage device.

Aspect 9: A back-up system where individual files get divided into pieces and placed randomly into a cloud fabric with one or more cloud storage providers.

Aspect 10: A back-up system where data can be synched via the Internet or by timed delivery over the Internet. When the back-up is complete the system can disconnect the connection to the Internet for added security.

Aspect 11: A back-up system using a key management system that authenticates users and enables the decryption of the data to the intended party.

Aspect 12: A back-up system that plugs into any other back-up system and appliances through an API layer (connection layer).

Aspect 13: A method of backing-up data that includes:
 scheduling a back-up that execute the proposed back-up until the job is complete;
 choosing a back-up by selecting a tile in an interface that is mapped to whatever files the user chooses;
 generating a warning signal that announces there was an unsuccessful data deliver.

Aspect 14: A back-up system that retrieves divided data being stored in diverse clouds and reassembles the data.

Aspect 15: A back-up system that uses secure encryption and tokenization for the secure transport of data to destination storage devices.

Aspect 16: A back-up system using physical device security at the end-point. This tamper respondent technology detects intrusion and blows the device encryption key in the event of a device breach.

Aspect 16: A back-up system that digitally creates remote back-ups and utilizes a key management system that uses multiple cloud locations to store the data.

Aspect 17: A back-up system that allows a data originator to pass a key to another user that allows that user to both retrieve and use the data.

Aspect 18: A method for backing-up data from a device to a server over the Internet, wherein the device intermittently connects and disconnects from the Internet and the schedule of connection to the Internet is synchronized with the server such that communication can occur with the server during periods of connection to the Internet, wherein when disconnected from the Internet, the device cannot communicate with other devices over the Internet. In some examples, the server can be synchronized with the Internet connection times such that little or no initialization of communication is necessary during a particular connection time. The device can connect to the Internet and begin transferring data for back-up, continuing where it left off at the end of the previous connection period without re-initializing communication.

Although a number of methods and systems are described herein, it is contemplated that a single system or method can include more than one of the above discussed subject matter. Accordingly, multiple of the above systems and methods can be used together in a single system or method.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A method of secured data storage, comprising:
 allowing a user to generate a manually generated list of designated data segment end storage locations;
 allowing the user to define configuration settings associated with the secured data storage, the configuration settings including a file filter, an interval schedule, and a cloud configuration, wherein the interval schedule defines how often the secured data storage is performed;
 a data segmenting device receiving the manually generated list of designated data segment end storage locations;
 the data segmenting device receiving data and segmenting the data into a plurality of data segments, wherein the plurality of data segments are equal in size, wherein the size is a user defined size selected by the user, and the user defined size is less than or equal to a maximum threshold;
 the data segmenting device encrypting the data;
 the data segmenting device assigning the plurality of data segments to two or more of the plurality of designated data segment end storage locations, wherein assigning the plurality of data segments to the two or more of the plurality of designated data segment end storage locations includes randomly selecting and assigning the two or more of the plurality of designated data segment end storage locations from the manually generated list of designated data segment end storage locations;
 the data segmenting device transmitting the plurality of data segments over a network to the two or more of the plurality of designated data segment end storage locations randomly selected and assigned by the data segmenting device;
 the two or more of the plurality of designated data segment end storage locations randomly selected and assigned by the data segmenting device receiving the plurality of data segments;
 storing the plurality of data segments at the two or more of the plurality of designated data segment end storage locations randomly selected and assigned by the data segmenting device; and
 the data segmenting device generating a report with information for retrieving all of the plurality of stored data segments from the two or more of the plurality of designated data segment end storage locations randomly selected and assigned by the data segmenting device and reassembling all of the plurality of stored data segments into the data.

2. The method of claim 1, wherein encrypting the data comprises encrypting the data before segmenting the data into the plurality of data segments.

3. The method of claim 1, wherein encrypting the data comprises encrypting each of the plurality of data segments.

4. The method of claim 1, wherein encrypting the data comprises encrypting the data before segmenting the data into the plurality of data segments and encrypting each of the plurality of data segments.

5. The method of claim 1, wherein the plurality of designated data segment end storage locations are cloud data end storage locations that store the plurality of data segments and the network is the Internet.

6. The method of claim 1, wherein the data is from a data storage device at a first location, and further comprising at the first location retrieving the plurality of stored data segments from the two or more of the plurality of data segment end storage locations and reassembling the plurality of stored data segments to reform the data.

7. The method of claim 1, wherein each of the two or more of the plurality of designated data segment end storage locations is assigned a single one of the plurality of data segments.

8. A secured data backup and storage method, comprising:
allowing a user to generate a manually generated list of designated data segment end storage locations;
allowing the user to define configuration settings associated with the secured data backup and storage, the configuration settings including a file filter, an interval schedule, and a cloud configuration, wherein the interval schedule defines how often the secured data backup and storage is performed;
a data segmenting device receiving the manually generated list of designated data segment end storage locations;
the data segmenting device receiving data that is stored in a data storage device at a first location and segmenting the data into a plurality of data segments, wherein the plurality of data segments are equal in size, wherein the size is a user defined size selected by the user, and the user defined size is less than or equal to a maximum threshold;
the data segmenting device encrypting the data;
the data segmenting device assigning the plurality of data segments to two or more of the plurality of designated data segment end storage locations that are available to the first location via a network, wherein assigning the plurality of data segments to the two or more of the plurality of designated data segment end storage locations includes randomly selecting and assigning the two or more of the plurality of designated data segment end storage locations from the manually generated list of designated data segment end storage locations;
the data segmenting device transmitting the plurality of data segments to the two or more of the plurality of designated data segment end storage locations randomly selected and assigned by the data segmenting device;
the two or more of the plurality of designated data segment end storage locations randomly selected and assigned by the data segmenting device receiving the plurality of data segments;
storing the plurality of data segments at the two or more of the plurality of designated data segment end storage locations randomly selected and assigned by the data segmenting device; and
the data segmenting device generating a report with information for retrieving all of the plurality of stored data segments from the two or more of the plurality of designated data segment end storage locations randomly selected and assigned by the data segmenting device and reassembling all of the plurality of stored data segments into the data.

9. The secured data backup and storage method of claim 8, wherein encrypting the data comprises encrypting the data before segmenting the data into the plurality of data segments.

10. The secured data backup and storage method of claim 8, wherein encrypting the data comprises encrypting each of the plurality of data segments.

11. The secured data backup and storage method of claim 8, wherein encrypting the data comprises encrypting the data before segmenting the data into the plurality of data segments and encrypting each of the plurality of data segments.

12. The secured data backup and storage method of claim 8, wherein the plurality of designated data segment end storage locations are cloud data end storage locations that store the plurality of data segments and the network is the Internet.

13. The secured data backup and storage method of claim 8, further comprising at the first location retrieving the plurality of stored data segments from the two or more of the plurality of designated data segment end storage locations and reassembling the plurality of stored data segments to reform the data.

14. The secured data backup and storage method of claim 8, wherein each of the two or more of the plurality of designated data segment end storage locations is assigned a single one of the plurality of data segments.

15. A secure data backup and storage system, comprising:
a data storage device at a first location;
a data segmenting device in communication with the data storage device for receiving data from the data storage device, the data segmenting device allowing a user to generate a manually generated list of designated data segment end storage locations and allowing the user to define configuration settings associated with the secured data storage, the configuration settings including a file filter, an interval schedule, and a cloud configuration, wherein the interval schedule defines how often the secured data storage is performed, the data segmenting device includes:
a data encryption module that encrypts data that is received from the data storage device;
a data segmenting module that segments data that is received from the data storage device into a plurality of data segments, wherein the plurality of data segments are equal in size, wherein the size is a user defined size selected by the user, and the user defined size is less than or equal to a maximum threshold;
a data segment assigning module that assigns the plurality of data segments to two or more of the plurality of designated data segment end storage locations from the manually generated list, wherein the data segment assigning module randomly selects and assign the two or more of the plurality of designated data segment end storage locations from the manually generated list of designated data segment end storage locations; and
a network interface that communicates over a network with the plurality of data segment end storage locations to send the plurality of data segments to the two or more of the plurality of designated data segment end storage locations randomly selected and assigned by the data segmenting assigning module for storage and to receive the plurality of stored data segments from the data segment end storage locations randomly selected and assigned by the data segmenting assigning module,
wherein the two or more of the plurality of designated data segment end storage locations randomly selected and assigned by the data segmenting assigning module receive the plurality of data segments and store the plurality of data segments therein, and
wherein the data segmenting device creates and stores a report with information for retrieving all of the plurality of stored data segments from the two or more of the plurality of designated data segment end storage locations randomly selected and assigned by the data segmenting assigning module and reassembling all of the plurality of stored data segments into the data.

16. The secured data backup and storage system of claim 15, wherein the data segmenting module that receives encrypted data from the data encryption module.

17. The secured data backup and storage system of claim 15, wherein the data encryption module that receives the plurality of data segments from the data segmenting module.

18. The secure data backup and storage system of claim 15, further comprising a user input device at the first location and connected to the data storage device, and the user input device allows a user to create the manually generated list.

19. The method of claim 1, further comprising storing the report in the data segmenting device.

20. The method of claim 1, wherein the report includes a key for decrypting each of the plurality of data segments, a file name assigned to each of the plurality of data segments, a file name assigned to the data, and a sequence required for reassembling the plurality of data segments into the data.

21. The method of claim 1, wherein the two or more of the plurality of designated data segment end storage locations are geographically separated from each other.

* * * * *